(12) United States Patent
Cheung et al.

(10) Patent No.: US 7,578,483 B1
(45) Date of Patent: Aug. 25, 2009

(54) CONFORMABLE SKIN ELEMENT SYSTEM FOR ACTIVE VORTEX CONTROL

(75) Inventors: Ken C. K. Cheung, Kailua, HI (US); Christopher J. Sullivan, Hauula, HI (US)

(73) Assignee: Oceanit Laboratories, Inc., Honolulu, HI (US)

( * ) Notice: Subject to any disclaimer, the term of this patent is extended or adjusted under 35 U.S.C. 154(b) by 1776 days.

(21) Appl. No.: 09/975,507

(22) Filed: Oct. 12, 2001

Related U.S. Application Data

(60) Provisional application No. 60/239,252, filed on Oct. 12, 2000.

(51) Int. Cl.
*B64C 13/16* (2006.01)
(52) U.S. Cl. ..................................................... 244/203
(58) Field of Classification Search ................. 244/130, 244/204, 205, 199, 201; 114/67 R
See application file for complete search history.

(56) References Cited

U.S. PATENT DOCUMENTS

| | | | | |
|---|---|---|---|---|
| 4,516,747 | A | * | 5/1985 | Lurz |
| 4,697,769 | A | * | 10/1987 | Blackwelder et al. |
| 4,802,642 | A | * | 2/1989 | Mangiarotty |
| 5,209,438 | A | * | 5/1993 | Wygnanski |
| 5,218,863 | A | * | 6/1993 | Mangalam |
| 5,752,672 | A | * | 5/1998 | McKillip |
| 5,803,409 | A | * | 9/1998 | Keefe |
| 5,818,947 | A | * | 10/1998 | Cattafesta et al. |
| 6,131,853 | A | * | 10/2000 | Bauer et al. |

FOREIGN PATENT DOCUMENTS

EP 589728 * 3/1994 ................. 244/204

* cited by examiner

*Primary Examiner*—Tien Dinh
(74) *Attorney, Agent, or Firm*—James Creighton Wray; Meera P. Narasimhan

(57) ABSTRACT

Conformable skin elements provide active vortex control. The skin element is mounted on a surface and acts like a pressure transducer and flow modifier. A micro-processor is coupled to the skin element and a feedback loop for controlling activation of the skin-element corresponding to surface pressures detected on the skin element. Additional pressure transducers may be provided for communicating with the feedback loop. These may include surface mounted taps or manometers and the like. Wires connect the skin elements, the feedback loop, and the micro-processor for conducting voltage to the skin elements and for transmitting pressure signals from the skin element via the feedback loop to the micro-processor. The skin element may be mounted on the surface by any known mounting system. Perimeter mounts on the skin element allow bulge deflection while cantilevered mounts allow cantilever deflection of the skin element. Aerodynamic forebody surfaces have the skin elements mounted circumferentially about a tip of the forebody. There may be one or more skin elements mounted according to the desired function. The skin elements may be of any shape.

22 Claims, 5 Drawing Sheets

CONFORMABLE SKIN ELEMENT SYSTEM FOR ACTIVE VORTEX CONTROL

This application claims the benefit of U.S. Provisional Application No. 60/239,252, filed Oct. 12, 2000.

BACKGROUND OF THE INVENTION

Flow past a slender body of revolution at high angle of attack separates from the leeward side of the body and rolls up into a pair of vortices. The aerodynamic forces imparted by the vortices enhance the lift of the vehicle. Above some critical angle, the vortices may become asymmetric, leading to unpredictable side forces that can exceed the aerodynamic vehicle's control capability, resulting in a departure from controlled flight.

Studies have shown that vortex asymmetry at high angles of attack is triggered by minute imperfections, or micro-asymmetries, located at the nose tip of the slender body. Numerous techniques have been used to actively control forebody vortex asymmetry, including suction/blowing (Yuan, Staudacher), strakes (Murri, Walters, Staudacher, Rao), and inflatable membranes (Zell), to varying degrees of success.

To be a viable solution, the system must have no ill performance effects at flight regimes where it is not needed. Thus, many solutions employ some sort of retractable feature so that they can be deployed as needed. One of the biggest challenges that arise is that the volume near the tip of a slender forebody is limited, and active vortex control systems that employ conventional mechanical or pneumatic action to deploy the system can take too much space to be of practical use.

SUMMARY OF THE INVENTION

The current invention overcomes the problems described above by replacing sections of the forebody skin surface with conformable elements, or patches made from piezoelectric material, or otherwise-actuated material. By replacing sections of the skin, no internal volume is utilized. Very thin gauge wire running longitudinally under the skin surface can be used to power the skin elements as well as be used for transmitting pressure information in the feedback loop back to the control system. The electronics controlling the closed-loop system can be located farther aft in the vehicle, away from the space-limited nose tip.

The skin elements' minute deformations, on the order of millimeters in size, can have macroscopic effects on the flow if the elements are placed in sensitive areas of the flow, for example, the area close to the tip of a slender forebody like that of a missile or aircraft.

Specifically, the piezoelectric material used as the conformable skin element can be piezo-ceramic or piezo-ceramic with a metal shim sandwiched in the center for structural stiffness. The piezoelectric material may also be configured as a bimorph, whereby two pieces of piezoelectric material, with or without an interface material, are adhered together to produce bending under an applied voltage. Piezoelectric film (polyvinylidene fluoride, PZT, Kynar) can also be used.

Piezoelectric materials modify their shape when a voltage is applied. Conversely, the material can produce charge in response to external stimuli such as sound, heat or force. This charge can be converted to voltage and used as a pressure sensor. Various shapes for the skin elements can be utilized, depending on the three-dimensional forebody shape, including strips, pointed strips, triangles, rectangles, and ovals. Other materials can also be used for the conformable skin that can be actuated via electromechanical, electromagnetic, heat or other means.

A network of small skin elements arrayed around the forebody tip will be able to create the skin imperfections necessary to change the vortex flow while maintaining a smooth, continuous surface when active vortex control is not necessary (i.e., at low angles of attack). The elements on the windward half of the forebody surface have greater effect on the flow, and thus there should be a greater concentration of elements on the windward side, near the tip of the forebody.

For applications where there is considerable roll variability (e.g., missile), the elements may be equally distributed circumferentially about the forebody nose surface. Particular distribution may vary depending on the design flight conditions of the vehicle, but at a minimum, two elements, nominally placed 45 degrees on either side of the windward ray and close to the tip, are necessary.

The conformable skin elements, made from piezoelectric material or other suitable material, are flush mounted onto the surface of an aerodynamic body, resulting in a near-continuous interface. The element may be attached along its perimeter, resulting in a "bulging" deformation. The element may also be attached with one end free, resulting in a cantilever-type deformation.

A conformable skin element system actively controls vortex formation and consequently, vortex lift, with two or more shape-changing elements that when un-activated are continuous with the aerodynamic surface so as to not affect design characteristics of the aerodynamic vehicle.

Conformable skin elements may be made from piezoelectric elements or otherwise-actuated material. The conformable elements deform with the application of voltage or other external stimuli, introducing disturbances into the flow and affecting vortex formation. The system can be used to effect vortex symmetry on an aerodynamic forebody at high angle of attack. Alternatively, the devices can induce vortex asymmetry, resulting in controllable side forces that enhance vehicle guidance and control. The same elements may be used as pressure transducers, allowing for a closed-loop sensing and control system.

These and further and other objects and features of the invention are apparent in the disclosure, which includes the above and ongoing written specification, with the claims and the drawings.

DETAILED DESCRIPTION OF PREFERRED EMBODIMENTS

Figure 1:
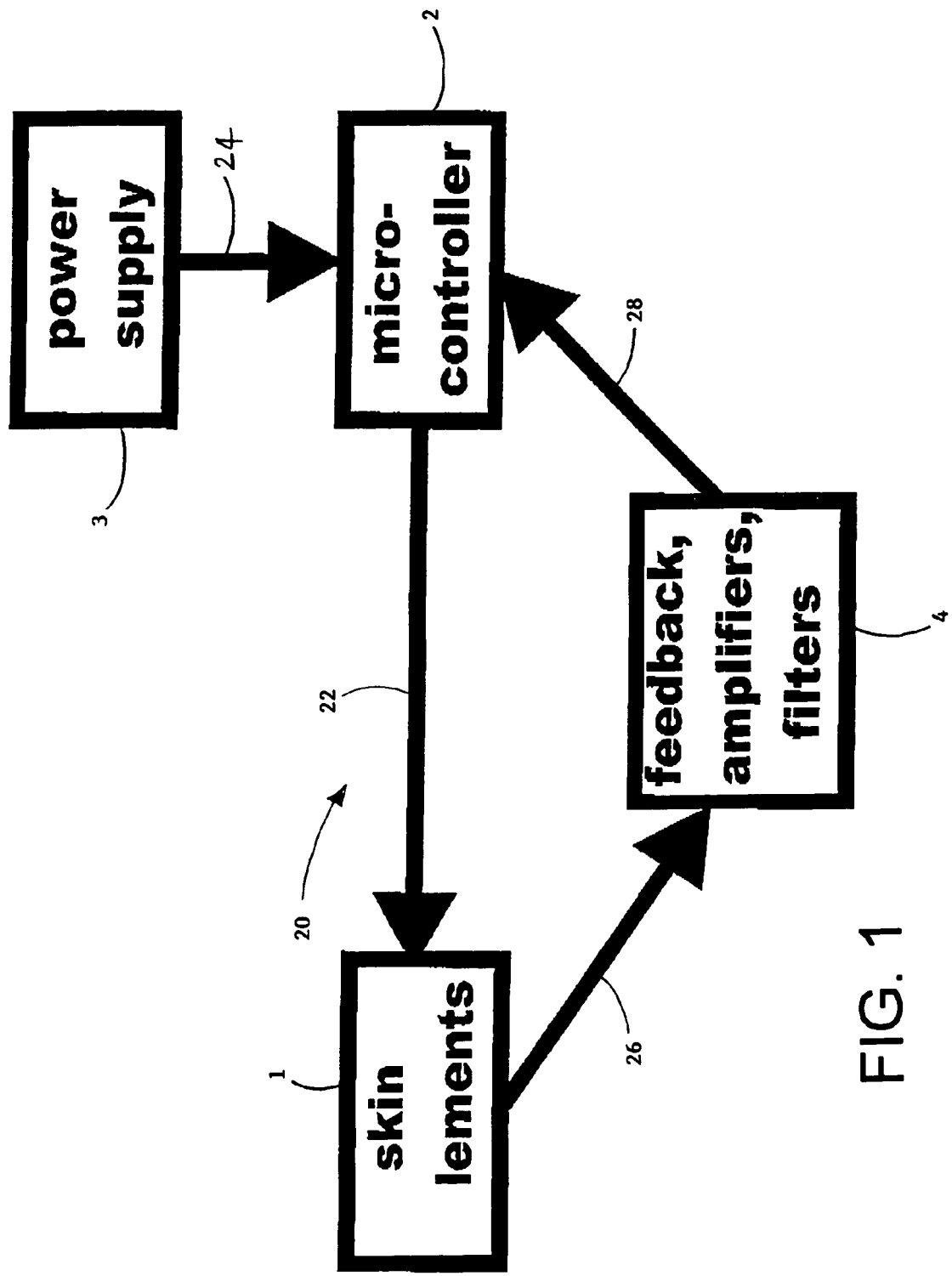
FIG. 1 is a schematic diagram of a conformable skin element system and feedback control loop.

As seen in FIG. 1, a schematic diagram of conformable skin element system 20 with a feedback control loop consists of conformable skin elements 1. The skin elements 1 all have connections 22, preferably electric connections, to a micro-controller 2. Micro-controller 2 may be, for example, a computer chip that determines which skin elements to activate depending on sensed signals from feedback 4. Power supply 3 is provided 24 to the micro-controller 2 from any known power supply such as, but not limited to, battery or vehicle power.

The skin elements act as pressure-transducers and provide pressure-transducer signals 26 to the feedback loop 4. Feedback loop 4, which comprises amplifiers and filter, takes the pressure-transducer signals 26 and amplifies and filters the signals and transmits 28 to micro-controller 2.

Figure 2:
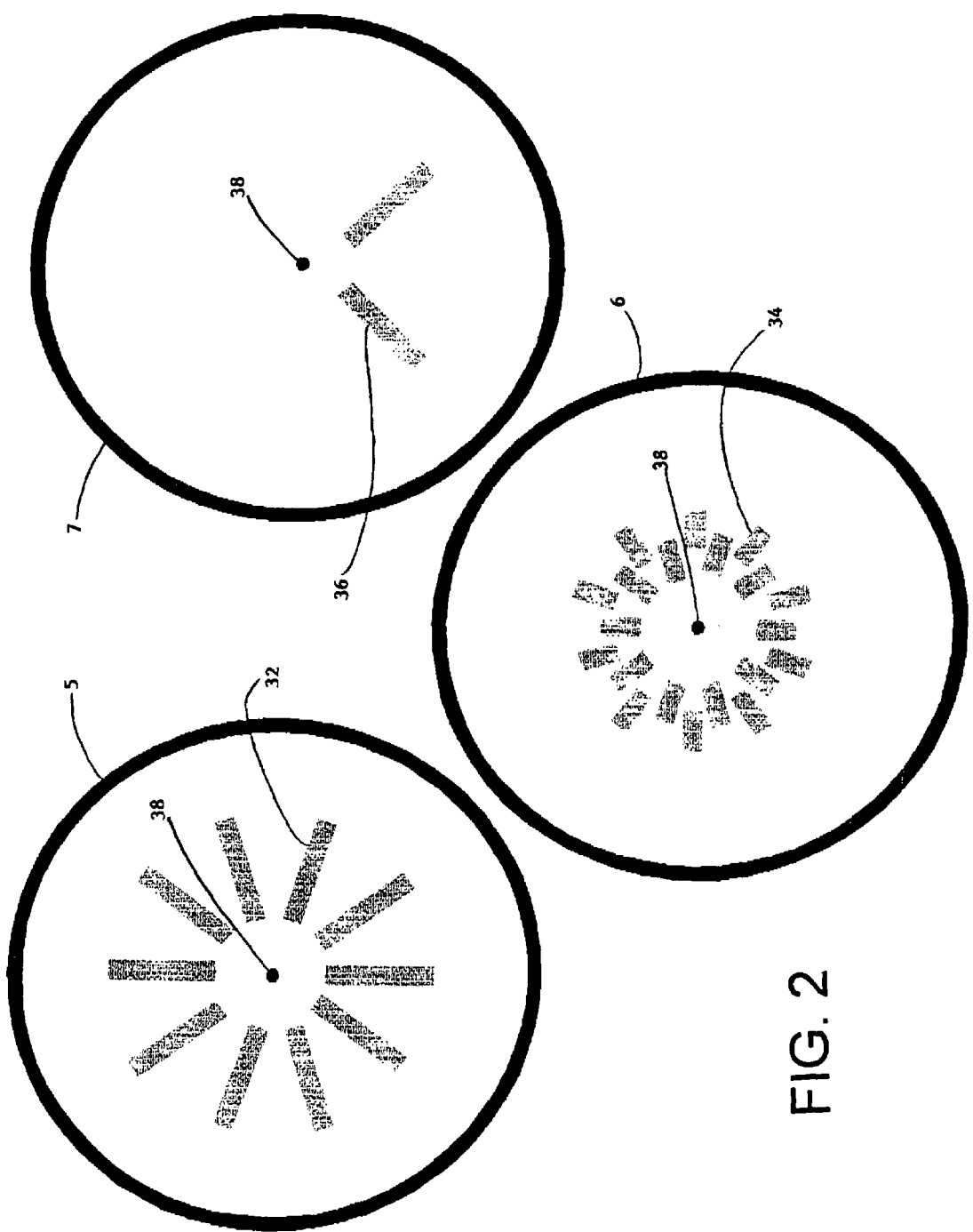
FIG. 2 shows different configuration examples of skin elements.

FIG. 2 shows different configurations 32, 34, 36, exemplary of the skin elements. Forebody 5, 6, 7, viewed from a front vantage point has tip 38 generally in the center of the forebody. The skin elements are distributed circumferentially about tip 38 in the forebody. The skin elements may be single or multi-layered. Forebody 5 has multiple single layers 32 of skin element around the tip 38. Forebody 6 has multiple layers 34 of skin elements. Forebody 7 has, for example, minimum required skin elements: a skin element 36 on either side of windward ray, approximately for example, but not limited to, 50-120 degrees apart from each other.

Figure 3:
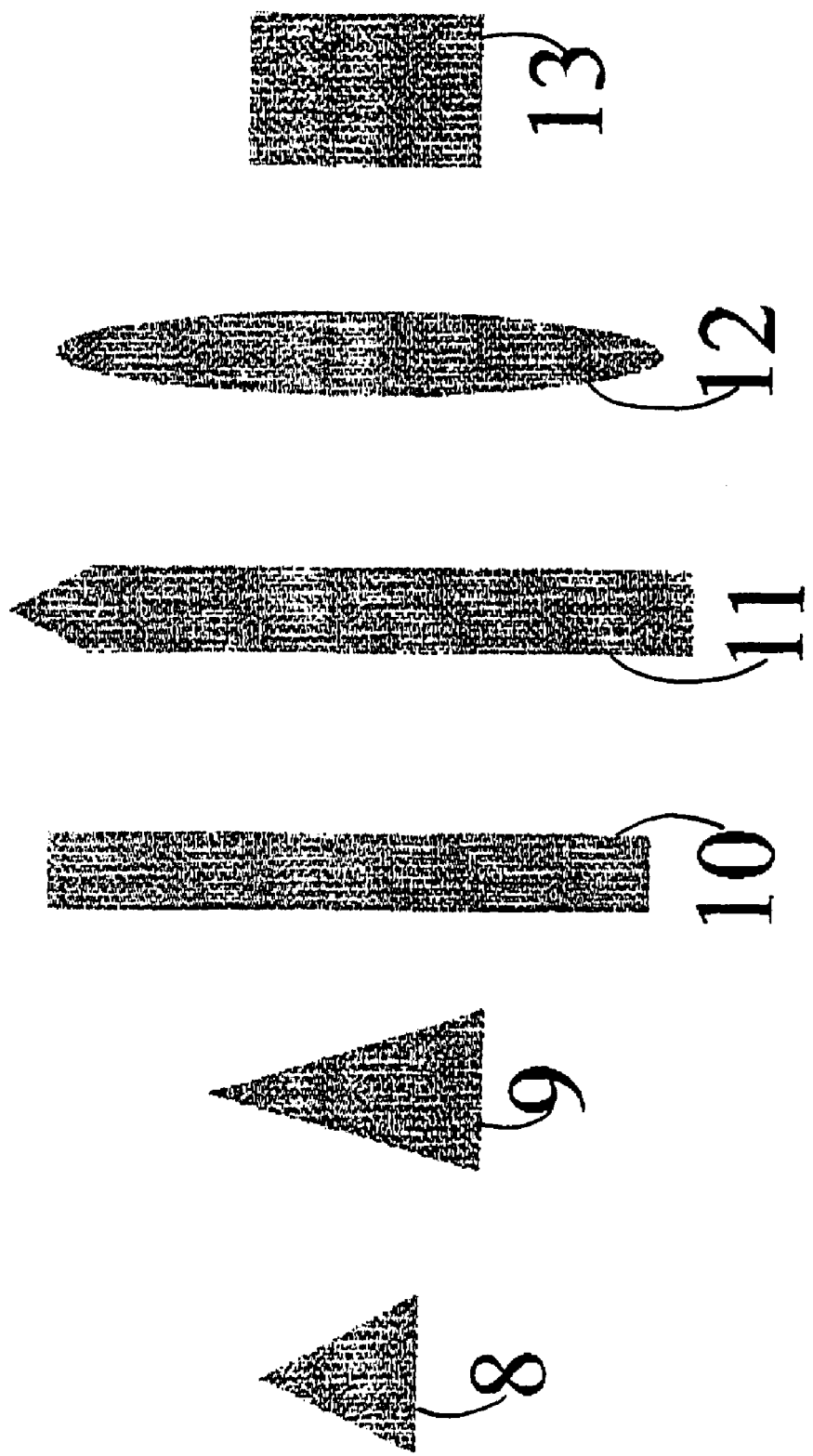
FIG. 3 shows examples of different shapes of piezoelectric skin elements.

FIG. 3 shows examples of different shapes of piezoelectric skin elements such as, but not limited to, triangular—equilateral 8 or isosceles 9; elongate strips 10; strips with pointed end(s) 11; oval 12; and rectangular 13.

Figure 4:
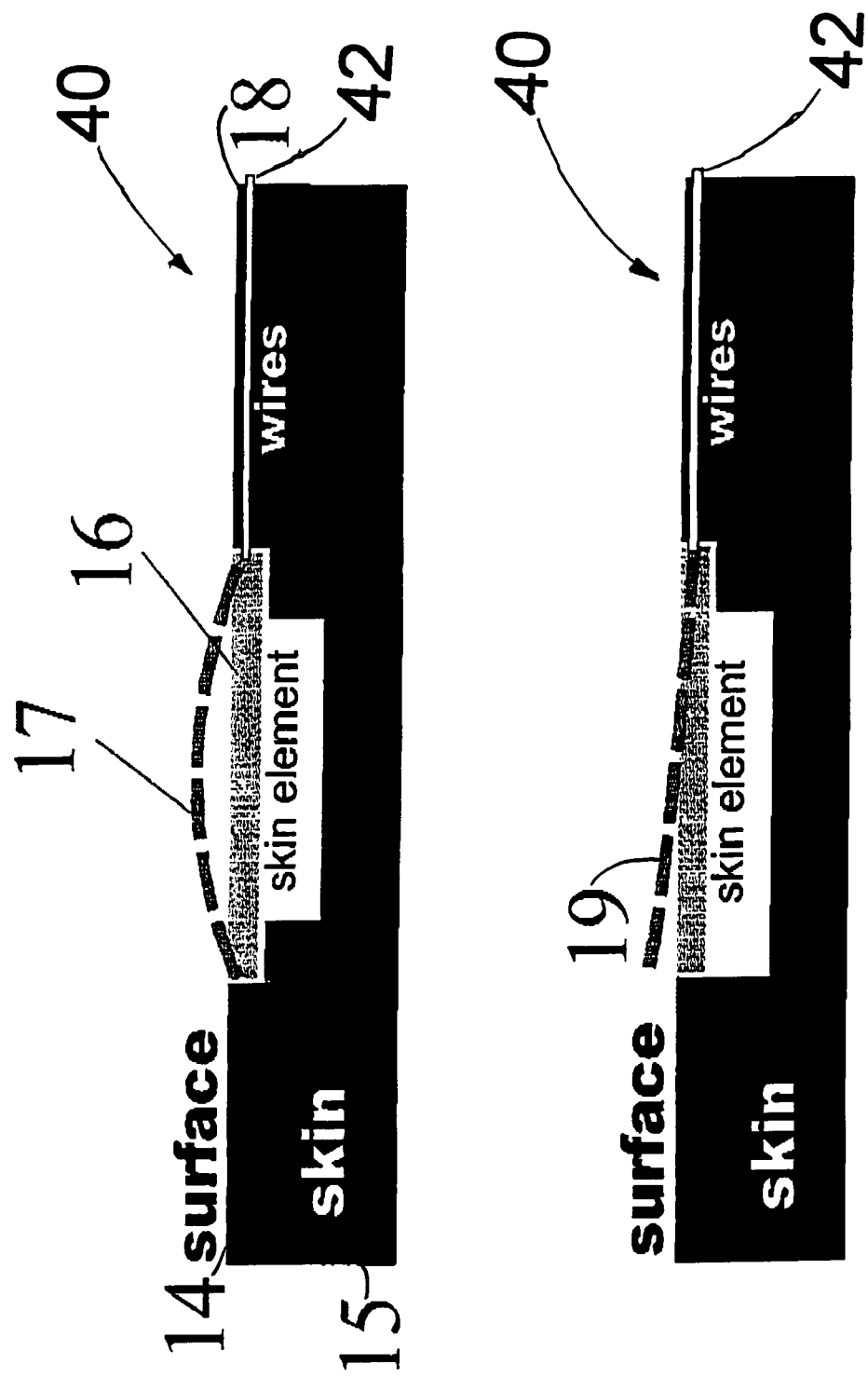
FIG. 4 shows the mounting and deflection of skin elements.

FIG. 4 shows the mounting and deflection of skin elements on a vehicle 40. Surface 14 of the aerodynamic vehicle 40 has skin layer 15. Conformable skin element 16 is flush-mounted with skin surface 14. After deflection skin element 16 has a shape 17, here shown as a bulge shape from mounting perimeter 18. Wires 42 are connected to the skin elements and lead to micro-controller 2 and feedback loop 4 (FIG. 1). The shape of the skin element after deflection varies. For example, in FIG. 4, the deflected skin element shape is not a bulge since the element has a cantilever mounting on the surface 14.

The inventive conformable skin element may be used for active vortex control. A preferred embodiment has piezoelectric material comprising conformable skin element. Other materials within the scope of this invention include, but are not limited to, electromechanical, electromagnetic or otherwise actuated material which comprise the conformable skin element, including temperature, light, pneumatic, hydraulic, and magnetically affected shape-changing materials. Examples include shape memory alloys (SMA) and magnetic elements. The preferred piezoelectric material may be piezo-ceramic, piezo-ceramic with metal shim, piezoelectric bimorph, or piezo-film.

The preferred skin-element size ranges from millimeters to several centimeters in length, with deformations typically in the millimeter range. The skin element acts as a pressure transducer as well as flow modifier. The preferred micro-controller or micro-computer is used to control the system. The system power supply may be, for example, via battery or vehicle on-board power. Feedback loop controls the skin-element activation based on surface pressures measured. This provides a closed-loop operation of the system. The system may also use separate conventional pressure transducers (taps, manometer, surface mounted) instead of skin elements for feedback loop. Wires conducting voltage to the elements and transmitting pressure/voltage via feedback loop may be located under the skin surface.

Figure 5:
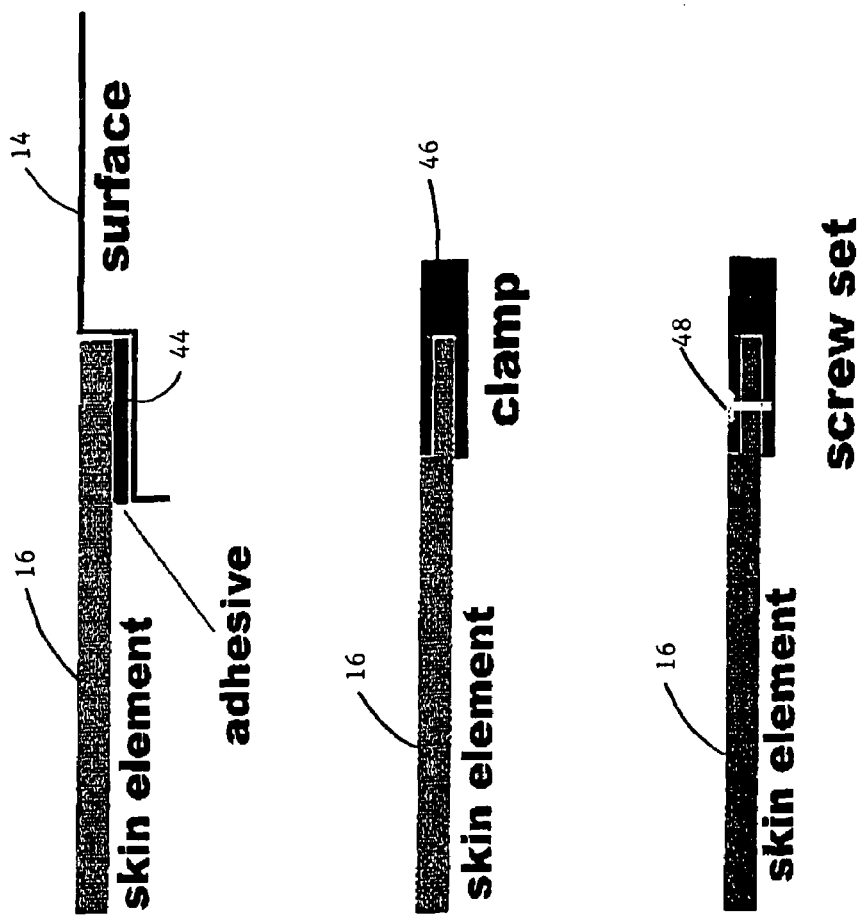
FIG. 5 shows the various mounting means for the skin element.

As exemplified in FIG. 5, the skin element 16 may be mounted on surfaces 16 with, for example, adhesive 44, clamp 46, or screw set 48. The mounting may be on the skin about a perimeter for bulge deflection or may be cantilever style for cantilever deflection. Multiple elements may be mounted circumferentially about a tip of the forebody, as close to the tip as possible. The invention may be a minimum of two elements, mounted one on either side of windward ray, approximately 50-120 degrees apart from each other. For applications with roll variability, the element may be evenly distributed about the nose of the forebody. For applications with no roll variability, greater concentration of the skin element is provided on the windward half.

Different shapes and sizes depending on application, including triangular, strip, pointed strip, oval, rectangle elements are within the scope of this invention. The resolution and placement of skin elements may be varied based on its applications and scenario where it is in use.

While the invention has been described with reference to specific embodiments, modifications and variations of the invention may be constructed without departing from the scope of the invention, which is defined in the following claims.

We claim:

1. A conformable skin element system comprising one or more conformable skin elements, each skin element forming a pressure transducer and flow modifier, a controller, connections for coupling the conformable skin elements and the controller, a feedback control loop for generating and transmitting signals between the skin elements, the controller and the connections for conforming the skin elements to desired deformations.

2. The system of claim 1, wherein the controller is a micro-controller.

3. The system of claim 2, wherein the micro-controller comprises programmable computer chips for sensing and processing the signals from the feedback and for selectively activating the skin elements to desired deformations.

4. The system of claim 2, wherein the connections are electrical connections.

5. The system of claim 4, further comprising a power supply connected to the micro-controller.

6. The system of claim 1, wherein the skin elements are pressure-transducers and wherein the signals are pressure-transducer signals provided to the feedback loop.

7. The system of claim 6, wherein the feedback loop comprises amplifiers for amplifying the signals and filters for filtering the signals transmitted to the micro-controller.

8. The system of claim 1, wherein the skin elements are shaped elements.

9. The system of claim 8, wherein the shaped elements have a configuration of at least two sides.

10. The system of claim 9, wherein the shaped elements have a configuration of more than two sides.

11. The system of claim 1, further comprising a surface, wherein the skin elements are mounted on the surface.

12. The system of claim 11, wherein the surface is on a vehicle.

13. The system of claim 12, wherein the surface is on an aerodynamic part of the vehicle.

14. The system of claim 13, wherein each skin element has a vehicle conformable shape from a mounting perimeter after activation.

15. The system of claim 14, wherein the conformable shape corresponds to a mounting pattern of the skin elements on the surface.

16. The system of claim 1, wherein the system is an active vortex controller.

17. The system of claim 1, wherein the skin elements comprise actuatable material.

18. The system of claim 17, wherein the material is piezoelectric material.

19. The system of claim 18, wherein the piezoelectric material is selected from a group consisting of piezo-ceramic, piezo-ceramic with metal shim, piezoelectric bimorph, piezo-film, and combinations thereof.

20. The system of claim 17, wherein the actuatable material is selected from a group consisting of electrical, mechanical, electromechanical, electromagnetic, electrothermal actuatable material and combinations thereof.

21. The system of claim 17, wherein the material is selected from a group consisting of shape-changing materials sensitive to temperature, light, pneumatic, hydraulic, magnetic effects and combinations thereof.

22. The system of claim 17, wherein the material is selected from a group consisting of shape memory alloys, magnetic elements and combinations thereof.

* * * * *